July 12, 1955     W. EXTON, JR     2,712,849

SEAT FOR HIGH SPEED CONVEYANCE

Original Filed June 19, 1948     2 Sheets-Sheet 1

INVENTOR.
William Exton, Jr.

BY

Attorneys

July 12, 1955     W. EXTON, JR     2,712,849

SEAT FOR HIGH SPEED CONVEYANCE

Original Filed June 19, 1948     2 Sheets-Sheet 2

INVENTOR.
William Exton, Jr.
BY
Attorneys

United States Patent Office 2,712,849
Patented July 12, 1955

2,712,849
SEAT FOR HIGH SPEED CONVEYANCE

William Exton, Jr., New York, N. Y.

Original application June 19, 1948, Serial No. 34,076. Divided and this application February 18, 1952, Serial No. 272,023

5 Claims. (Cl. 155—14)

This invention relates to body-supporting apparatus for the occupants of high speed conveyances, particularly aircraft, and especially to seats for supporting the occupant in a normal seated position and so constructed and arranged that excessive inertia forces resulting from deceleration automatically move the support to give the occupant maximum protection.

This application is a division of my copending application Ser. No. 34,076, filed June 19, 1948, now Patent No. 2,611,562.

Excessive inertia forces may be applied to the occupants of modern aircraft or other high speed vehicles under various conditions, particularly sudden changes in velocity, either positive or negative, that is with either acceleration or deceleration, opposed to the tendency of the body to continue in motion at constant speed or at rest, as the case may be. Examples of situations giving rise to such velocity changes are catapult launching, sudden application or failure of great propulsive power in the vehicle itself and most importantly where the vehicle is brought to a sudden stop as in a crash. Other similar situations may exist in the case of escape devices wherein an airplane is equipped with a life-saving device in the nature of a capsule containing the occupant's seat which is adapted to be separated from a plane moving at high, and perhaps supersonic, speed and which of necessity suddenly decreases its velocity upon separation from the rest of the plane into the relatively stationary surrounding air.

An object of this invention is to provide a seat for the occupant of a conveyance which is movable and which, in response to inertia forces in excess of a predetermined amount, will move in such a way as to give the most adequate support to the body of the occupant against the effects of deceleration forces.

Another object is to so move the support so that it is interposed between the body and the place toward which the inertia force tends to move it.

Another object is to provide a seat which normally faces in the direction of travel and is adapted to reverse its position upon sudden deceleration, and which upon reversal preferably moves a short distance in the direction of travel to perform a shock-absorbing function.

Other objects and advantages of the invention will in part appear and in part will be obvious from the ensuing description.

Various embodiments of the invention which illustrate the means by which the foregoing objects are attained are hereinafter described in conjunction with the drawings, in which.

Figure 1:
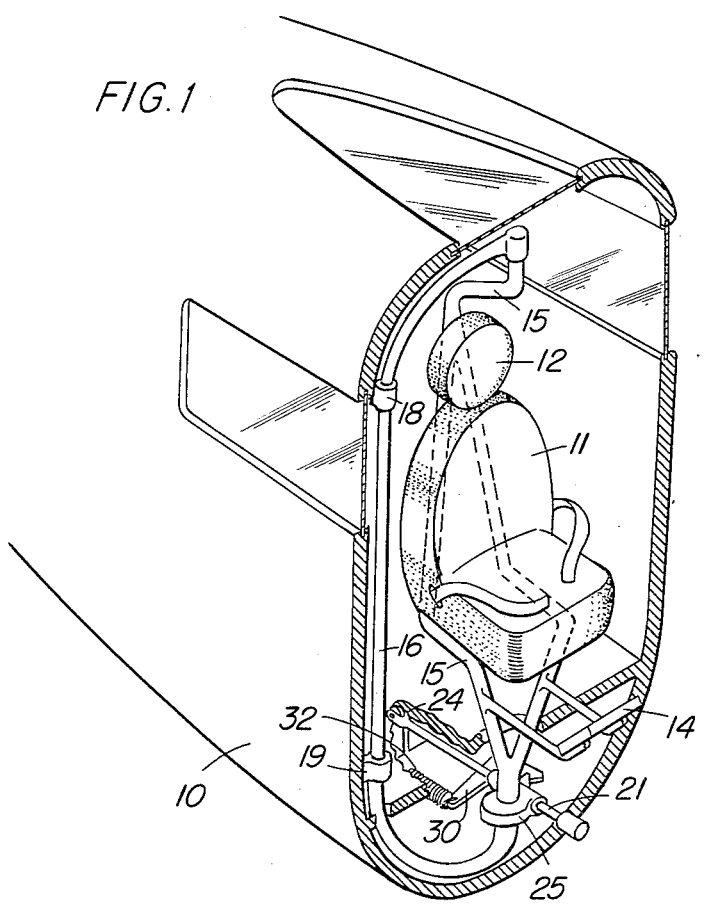
Fig. 1 shows a seat, with headrest and footrest, mounted for movement in a fore and aft direction and associated with gear-operated mechanism adapted to turn the seat through 180°, reversing the occupant, upon sudden deceleration.
Figure 2:
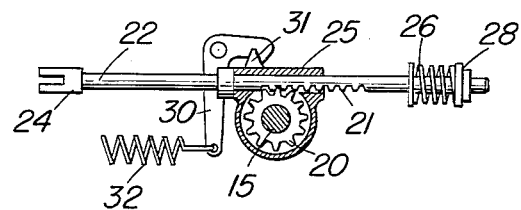
Fig. 2 is a detail of the seat reversing mechanism of Fig. 1.

Referring to Figs. 1 and 2, I have shown within the cabin 10 of an airplane a support in the form of a seat 11 having a headrest 12 and a footrest 14. This seat is rigidly attached to a supporting framework 15 which is pivotally supported at top and bottom from a davit 16 rotatably mounted on one side of the fuselage or body 10 of the aircraft or other conveyance by bearing brackets 18 and 19. The seat is assumed to be normally facing in a forward direction. At its lower end the frame 15 is provided with a fixed pinion 20 (Fig. 2) which engages with rack portion 21 of a shaft 22 which may be attached to the fuselage by a clevis 24. Surrounding the shaft 22 and pinion 20 is a housing 25 adapted to slide along shaft 22 and maintain the rack and pinion in engagement. At its forward end shaft 22 is provided with a buffer in the form of a spring 26 which bears against the fixed collar 28.

The structure just described is primarily intended to protect the occupant of seat 11 against the effects of sudden deceleration. The seat is normally held in its forwardly facing position by a notched bellcrank-shaped detent 30 which is held in engagement with a lug 31 on housing 25 by a spring 32 the tension of which may be adjusted so as to release the seat only when the inertia force exceeds a predetermined amount. Upon such release, housing 25 and frame 15 will move forward and travel of the pinion 20 along the rack 21 will cause the seat 11 to be rotated through 180° thus interposing the seat between the occupant and the point toward which the inertia force is tending to move him. The seat assembly will be brought to a stop by engagement with the spring 26. It will be evident that the inertia force will be acting upon the body of the occupant, at the time when its motion ceases, in a front to back direction, that is, toward the supporting back of the seat.

Figure 3:
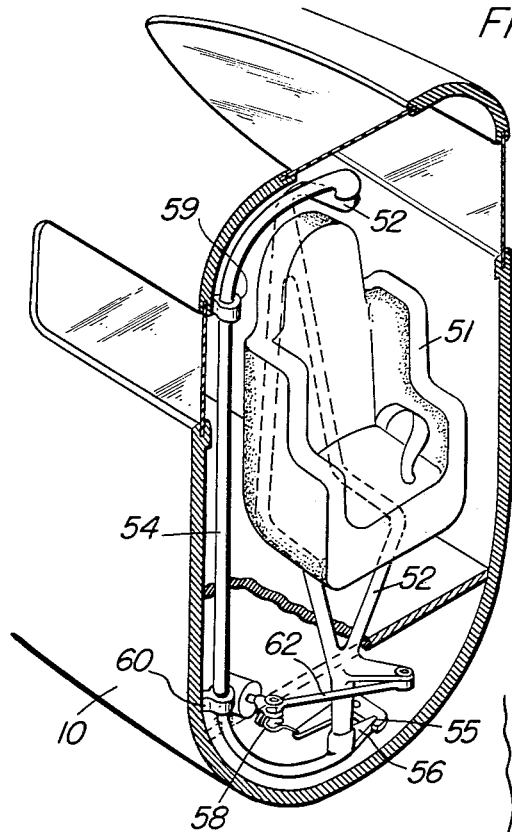
Fig. 3 shows another form of seat adapted to be reversed, upon sudden deceleration, by crank operated mechanism.
Figure 4:
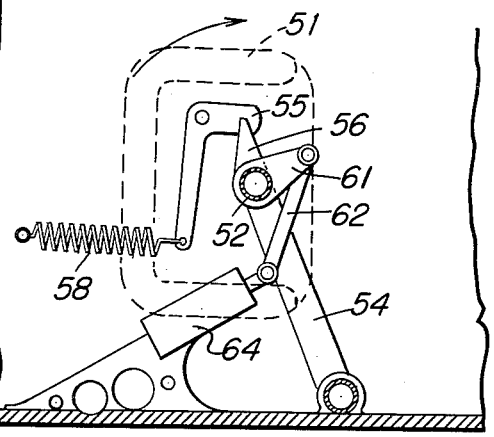
Fig. 4 shows the reversing mechanism of Fig. 3 in normal position.
Figure 5:
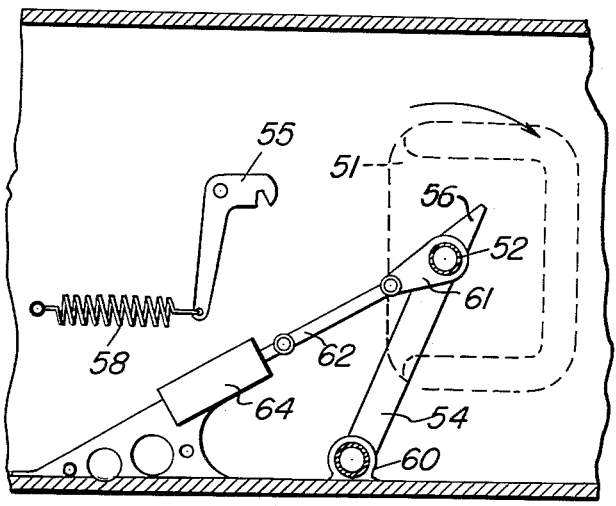
Fig. 5 shows the same in the position it assumes upon reversal of the seat.

Referring to Figs. 3, 4 and 5, I show another form of seat generally similar to that of Fig. 1 but actuated by crank mechanism instead of a rack and pinion. The seat 51 is attached to a support 52 pivoted at top and bottom on a davit 54. Detent 55 engages a lug 56 attached to the davit and is yieldably held in engagement therewith by a spring 58. The davit is pivotally mounted to the fuselage by brackets 59, 60. Frame 52 is provided at its lower end with a crank 61 which is attached by the link 62 to a shock absorber 64 anchored to the fuselage 10. Comparison of Figs. 4 and 5 shows that when inertia forces resulting from sudden deceleration are sufficient to overcome the restraining effect of detent 55 the ends of davit 54, together with the seat, will move forward and that link 62 acting through crank 61 will cause the seat to be rotated through 180°. At the end of this movement crank 61 and link 62 are in a straight line and are brought to a stop by the action of shock-absorber 64.

While the structures of Figs. 1 and 3 are shown with seat-actuating mechanism only at the lower end, it is contemplated that such mechanism may be utilized at the upper ends of the frames 15 or 52 or at both ends thereof depending upon the magnitude of the forces which may be expected to operate upon the seats and their supports.

As to both embodiments of the invention shown and described, it is also contemplated that the structures may be provided with manually operated controls by means of which the seats may be placed in any of the positions which they are capable of assuming under the influence of inertia forces, in contemplation of the coming into effect of such forces. For example, an occupant of the seat of Fig. 1 or Fig. 3, contemplating sudden deceleration such as might exist in a forced landing or upon the cessation of propulsive power, may manually rotate the seats into reversed position in advance of such an event.

While the invention has been described in conjunction with specific embodiments described in detail, it is to be understood that the invention is not limited thereto but is to be construed broadly within the purview of the claims.

What is claimed is:

1. The combination with a seat having a back rest, means for rotatably supporting the seat from the body of a vehicle in a normally forwardly facing position, said means permitting limited forward movement of the seat on rapid deceleration of forward movement of the vehicle, and means effective on said forward movement automatically to rotate said seat into a rearwardly facing position, of a movable detent normally acting to secure said seat supporting means against forward movement when said seat is in its forwardly facing position, and resilient restraining means for said detent adapted to yield to permit movement of said seat only in response to inertia force of a predetermined minimum amount and to thereafter return said detent to its normal position, whereby upon such inertia force being exceeded said seat moves forwardly and is thereupon rotated by said rotating means into rearwardly facing position to interpose said back rest between the occupant of the seat and the place toward which said force tends to move him, said seat being returnable to its forwardly facing position to again be restrained by said detent.

2. The device of claim 1 wherein the means for rotating the seat includes a crank movable with said seat and a link interconnecting said crank and the vehicle body, said link being connected to said body through shock absorbing means.

3. The device of claim 1 wherein the means for rotating the seat includes a rack fixed to said vehicle body, a pinion fixed on said seat supporting means and in operative relation to said rack, and means for stopping the forward movement of said supporting means when the seat has attained its reversed position.

4. The structure of claim 3 wherein said means for stopping the forward movement comprises buffering means.

5. The structure of claim 3 wherein said pinion is rotatably supported in a housing slidably supported on said rack.

References Cited in the file of this patent

UNITED STATES PATENTS

| | | |
|---|---|---|
| 1,250,155 | Emond | Dec. 18, 1917 |
| 2,290,464 | Buchheit | July 21, 1942 |
| 2,346,895 | Bergman | Apr. 18, 1944 |
| 2,401,748 | Dillon | June 11, 1946 |
| 2,433,950 | Henderson | Jan. 6, 1948 |
| 2,577,313 | Quilter | June 19, 1951 |